Patented Apr. 13, 1926.                                              1,580,428

UNITED STATES PATENT OFFICE.

FRANK FENTON, OF AKRON, OHIO, ASSIGNOR TO THE MILLER RUBBER COMPANY, OF AKRON, OHIO, A CORPORATION OF OHIO.

METHOD OF PRODUCING EMBOSSED SHEET RUBBER.

No Drawing.            Application filed February 14, 1925. Serial No. 9,296.

*To all whom it may concern:*

Be it known that I, FRANK FENTON, a citizen of the United States, and resident of Akron, in the county of Summit and State of Ohio, have invented certain new and useful Improvements in Methods of Producing Embossed Sheet Rubber, of which the following is a specification.

My present invention relates to improvements in the art of producing vulcanized rubber in sheet form having an ornamental or embossed surface and aims to provide a simple, economical and expeditious process whereby the article may be given an extremely attractive surface appearance.

The invention was designed particularly in connection with the production of rubber sheets used in the manufacture of rubber reducing corsets, but is not limited to such use, being applicable as well to the production of sheets which are applicable to a large variety of uses as will be readily apparent.

In proceeding according to the said invention a suitable rubber compound is run on an ordinary smooth roll calender to produce a sheet of the desired thickness, being preferably run on a sheet of plain Holland cloth, and the exposed surface is dusted with soap stone or analogous powdered material for convenience in handling, this material reducing or removing the stickiness of said surface. The rubber is then removed from the Holland cloth and cut into pieces of the desired size and shape for the intended article or articles. The compound selected for producing the rubber sheets is one which is either of a non-curing nature per se, which requires the application thereto of an additional migratory agent to effect low temperature vulcanization or one which is ordinarily a high temperature curing material but which upon having a migratory agent to effect low temperature of vulcanization applied thereto, will vulcanize at such low temperature and after the sheets have been produced as above specified, such additional migratory agent is applied to the surface thereof.

For example, the sheet forming batch may comprise the usual ingredients such as rubber with coloring and filling materials and an accelerator but no sulphur, and the sulphur may be applied to or sprinkled over the surface of the sheet or sheets in powdered form or the compound may include the sulphur and a migratory accelerator may be applied to the surface of the sheet. Thereafter the rubber sheets are packed between sheets of material which will not become vulcanized to the rubber during vulcanization or be injured by the vulcanizing temperature.

These sheets are embossed with the design which it is desired to impart to the surface of the rubber. Such embossed sheets may for example, be made of paper.

In practise I find it desirable to superpose a considerable number of sheets of paper and rubber for convenience in manufacture and in order to prevent duplication of the design on one sheet of rubber, find it advisable to place a pad of vulcanized rubber between the sets of rubber and paper sheets. In other words, when preparing a stack of rubber sheets for vulcanization, the operator first lays down a rubber pad, places thereon an embossed sheet of paper, applies thereto the sheet of rubber to be embossed and then another sheet of paper, then another rubber pad and so on until a convenient number of sheets have been assembled. In assembling the rubber and paper sheets in this way, it will be understood that embossing of the rubber takes place on both surfaces and that there is no difference in the process whether the side of the rubber which was dusted with sulphur contacts with the paper or whether the soap stone side of the rubber contacts with paper. As far as this process is concerned, however, I find that the surface which was dusted with sulphur is inclined to be more tacky and therefore more suitable for the application of any reinforcements which I may wish to afterwards cement thereto.

The stack of assembled sheets are next subjected to a vulcanizing temperature preferably by placing it in a dry heat oven and subjecting it to a moderate vulcanizing temperature, the degree and duration of heat depending upon the ingredients employed as will be well understood by those skilled in the art.

A suitable amount of pressure is applied to the stack of sheets during vulcanization. This may be accomplished by any suitable means as for example, by placing a weight or heavy plate of metal on top of the stack.

In the manufacture of some articles as for example, reducing corsets, I find it desirable to subject the rubber to only a partial cure such that the compound will have been thoroughly set but the sulphured side thereof will be sufficiently tacky that reinforcing strips of rubberized fabric may be attached thereto by simply moistening the surface with benzine and rolling in place.

The assembled articles are then again packed between sheets of paper and subjected to further vulcanization. It is found that during such further vulcanization, the same embossed paper may be used if desired in order to impress the reinforcing strips. However, such embossing will have no effect upon the sheets which have previously been subjected to partial vulcanization and therefore, the embossed design need not be in register with the design previously imparted thereto.

Having thus described my invention what I claim is:

The herein described method of producing an embossed sheet rubber article having fabric reinforcements which consists in providing a sheet of rubber compound containing one of two ingredients which will coact to effect vulcanization, applying the other ingredient to the surface of the sheet, applying an embossed sheet to said surface, subjecting the assembly to a vulcanizing action, removing said embossed sheet and applying fabric reinforcements to the partially vulcanized rubber sheet, reassembling said rubber sheet and the embossed sheet and comp'eting vulcanization under heat and pressure.

In testimony whereof, I affix my signature.

FRANK FENTON.